(12) United States Patent
Sawert et al.

(10) Patent No.: US 6,360,766 B1
(45) Date of Patent: Mar. 26, 2002

(54) CHECK VALVE WITH AN INTEGRAL BREAKAWAY RETAINER

(75) Inventors: Ulf Sawert, Grand Blanc; Dale Richard Jones, Flushing; Sharon Elizabeth Beyer, Grand Blanc; Steven A. Kessler, Allendale, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/629,689

(22) Filed: Aug. 1, 2000

(51) Int. Cl.$^7$ .......................... F16K 15/02; F02M 37/00
(52) U.S. Cl. .................. 137/15.18; 137/315.33; 137/533.17
(58) Field of Search .................... 137/15.17, 15.18, 137/15.19, 315.11, 315.33, 528, 533, 533.17, 533.19, 543.21; 123/514

(56) References Cited

U.S. PATENT DOCUMENTS

| | | | | |
|---|---|---|---|---|
| 1,207,111 A | * | 12/1916 | Wilberger | 137/533 |
| 1,913,116 A | * | 6/1933 | Haimbaugh | 137/533.17 |
| 2,755,816 A | * | 7/1956 | Collins | 137/533.17 |
| 3,099,999 A | * | 8/1963 | Vismara | 137/533.17 |
| 3,903,922 A | * | 9/1975 | Buckman | 137/852 |
| 4,622,989 A | * | 11/1986 | Zlotski | 137/315.33 |
| 6,216,671 B1 | * | 11/1999 | Sawert et al. | 123/509 |

* cited by examiner

Primary Examiner—John Rivell
Assistant Examiner—Ramesh Krishnamurthy
(74) Attorney, Agent, or Firm—Vincent A. Cichosz

(57) ABSTRACT

A check valve plunger assembly for use in a fluid channel is provided. The check valve plunger assembly includes a check valve plunger having a first end, a second end, and a body portion. The body portion extends between the first and second end of the check valve plunger. The plunger assembly also includes an integral breakaway retention device having a ring shaped portion. The retention device is capable of being positioned around the check valve plunger such that the ring shaped portion surrounds at least a portion of the first end of the check valve plunger. Breakaway connectors are provided which connect the first end of the check valve plunger with the ring shaped portion of the retention device. After assembly, the check valve plunger is separated from the breakaway connectors and the plunger is able to freely move within the fluid channel. The present invention also provides a method of inserting this check valve plunger within the fluid channel.

18 Claims, 4 Drawing Sheets

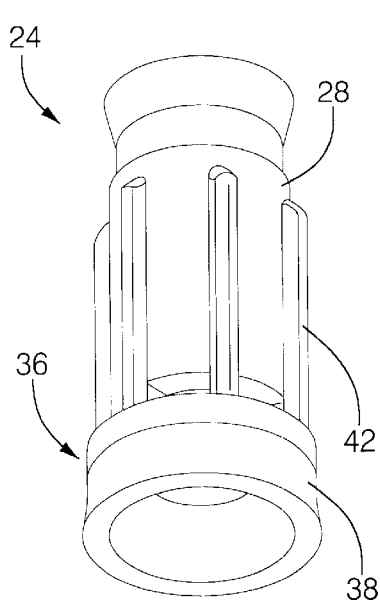
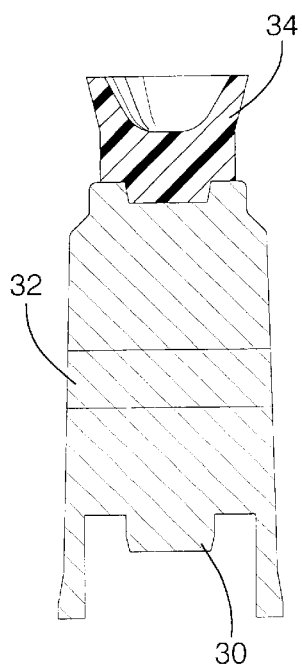
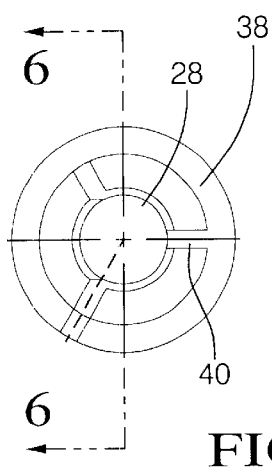
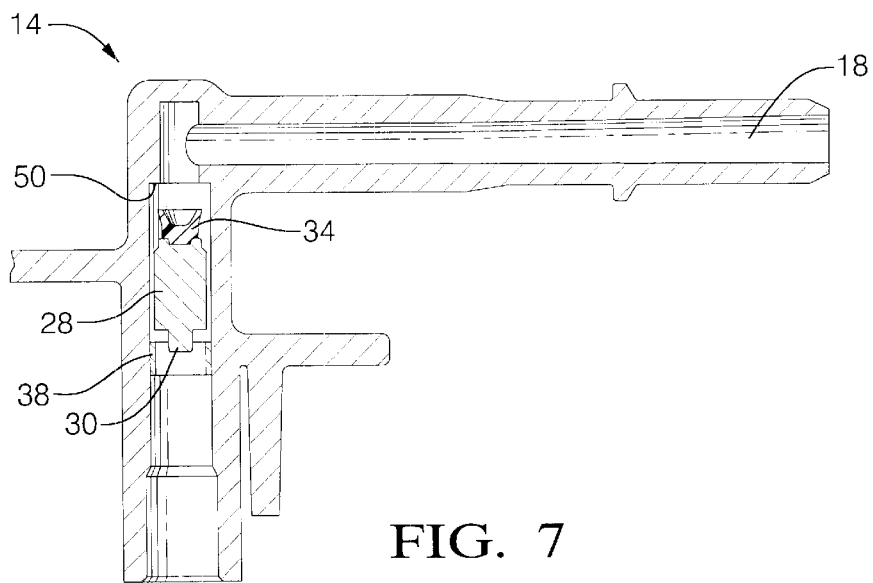
FIG. 4
FIG. 6
FIG. 5
FIG. 7

CHECK VALVE WITH AN INTEGRAL BREAKAWAY RETAINER

FIELD OF THE INVENTION

The invention generally relates to a check valve plunger and a method of installing the check valve plunger in a fluid channel. More particularly, the invention pertains to a return line check valve plunger assembly including a novel retention device. The invention also relates to a method of installing a return line check valve plunger assembly within a return line channel in the cover of a modular reservoir assembly.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

A modular reservoir assembly is a device used in an automotive fuel system for delivering fuel to the engine. It is typically inserted in the fuel tank through a hole in the top of the tank. A modular reservoir assembly typically includes a reservoir, a fuel pump, a fuel level transducer attached to the reservoir, a cover, elements for attaching the reservoir to the cover, and various conduits for conveying high and low pressure fuel from the reservoir to the cover. The fuel pump is located inside the reservoir to avoid momentary fuel starvation, as can occur while the vehicle is turning when the fuel level within the tank is low. The cover is clamped to the top of the fuel tank to close the hole through which the module is installed.

FIG. 1 illustrates a modular reservoir assembly, generally designated 10, in partial cross-section. It includes a reservoir 12 and a cover 14. The cover 14 features a plurality of fluid connectors or channels 16 and 18. Fluid channel 16 provides attachment to a high pressure hose 20 for supplying fuel 21 from the reservoir 12 to the engine. Fluid channel 18 provides attachment to a low pressure return hose 22 for returning hot fuel and/or vapor from the engine to the reservoir 12. The returning fuel is usually quite hot, given that it has circulated through relatively hot areas of the engine compartment. A vapor purge connector is also typically provided in the cover 14 of the reservoir assembly 10.

The modular reservoir assembly 10 contains a prior art check valve plunger 8. It is disposed within the return line fluid channel 18 on the underside of the cover 14. When in the closed state, the check valve plunger 8 prevents or "checks" fuel and/or vapor from flowing out of the reservoir 12 and into the return line fluid channel 18. When in the open state, the check valve plunger 8 enables the hot return fuel mixture 25 to enter into the reservoir 12. The reverse flow of the fuel and/or vapor can occur when the vehicle has overturned or the fuel line is severed, such as in accident situations. This reverse fuel flow could present a hazardous condition. Reverse flow can also inadvertently occur during maintenance of the vehicle. The check valve plunger 8 thus prevents fuel and/or vapor from flowing out of the reservoir 12 and, more importantly, prevents leakage of fuel and vapor out of the vehicle.

During normal use of the modular reservoir assembly 10, the cover 14 may be put in a position that allows the check valve plunger 8 to undesirably fall out. Consequently, the valve 8 is currently restrained within the cover 14 by guide rods that are subsequently pressed into the cover 14. Current techniques for pressing the guide rods into the cover 14 also require the cover 14 to be in a position that allows the plunger 8 to undesirably fall out during insertion of the guide rods. Therefore, there is a need in the art for a retaining mechanism to keep the check valve plunger 8 from falling out during the placement of the guide rods into the cover 14 and/or during use of the cover 14 on the modular reservoir assembly 10.

OBJECTIVES OF THE INVENTION

It is, therefore, an objective of the invention to provide a retention device that enables the reliable assembly of a check valve plunger within a fluid channel.

Another objective is to eliminate the likelihood of a check valve plunger from falling out of the fluid channel prior to the insertion of a guide rod within the channel.

Yet another objective is to provide a retention device that is capable of retaining the check valve plunger within the cover of the modular reservoir assembly during use.

Another objective is to use an integrated feature of the retainer so as to greatly reduce labor and cost of assembly if a separate retaining device were to be used.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by the various embodiments of the invention summarized below.

The invention provides a check valve plunger assembly having an integral breakaway retention device. The assembly includes a check valve plunger having a first end, a second end, and a body portion extending between the first and second end. The retention device features a ring shaped portion. The retention device is capable of being positioned around the check valve plunger so that the ring shaped portion surrounds at least a portion of the first end of the check valve plunger. A breakaway means is also provided. The breakaway means connects the first end of the check valve plunger with the ring shaped portion of the retention device.

The invention also provides a method of inserting this check valve plunger within a fluid channel. The method includes the step of providing a check valve plunger assembly having an integral breakaway retention device, with the integral breakaway retention device being connected with a portion of the check valve plunger by at least one connection means. Another step involves inserting the check valve plunger assembly within the fluid channel. Further steps include providing a separation means for breaking the at least one connection means and inserting the separating means between the check valve plunger assembly and the retention device to break the connection means. Breaking of the connection means results in separation of the check valve plunger from the retention device enabling the check valve plunger to move within the fluid channel.

BRIEF DESCRIPTION OF THE DRAWINGS

FIG. 4 is a perspective view of a check valve plunger assembly according to the invention including an optional elastomeric sealing member.

FIG. 5 is an end view of the check valve plunger assembly according to the invention.

FIG. 6 is a cross-sectional view taken along line VI—VI of the check valve plunger assembly shown in FIG. 5.

FIG. 7 is a partial sectional view of the cover of the modular reservoir assembly, illustrating the check valve plunger assembly of FIG. 4 in an open state within the return line fluid channel.

DETAILED DESCRIPTION OF THE INVENTION

Figure 1:
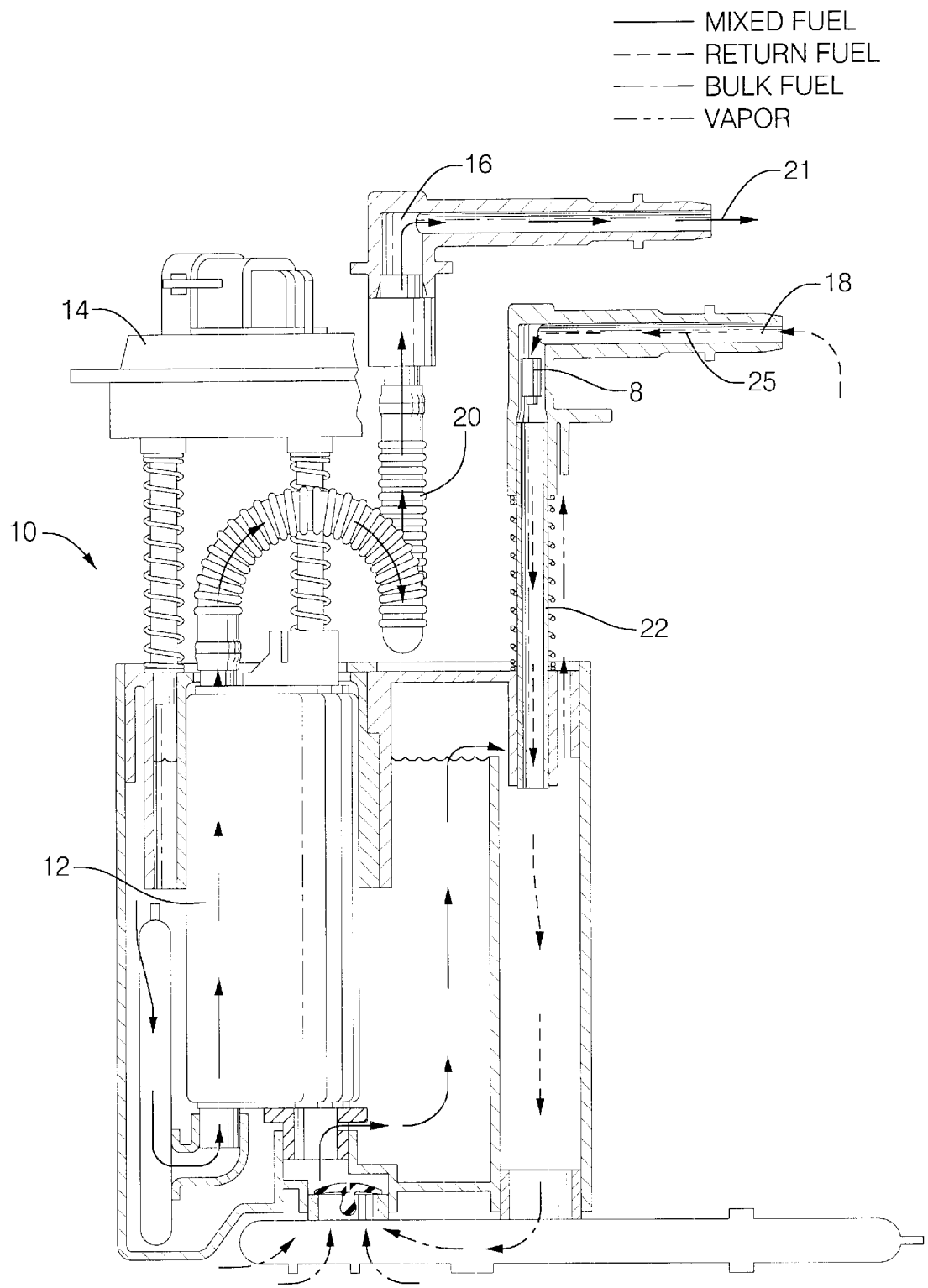
FIG. 1 is a partial cross-sectional view of a modular reservoir assembly including a prior art check valve plunger.

Before describing the invention in detail, the reader is advised that, for the sake of clarity and understanding, identical components having identical functions have been marked where possible with the same reference numerals in each of the Figures provided in this document.

Figure 2:
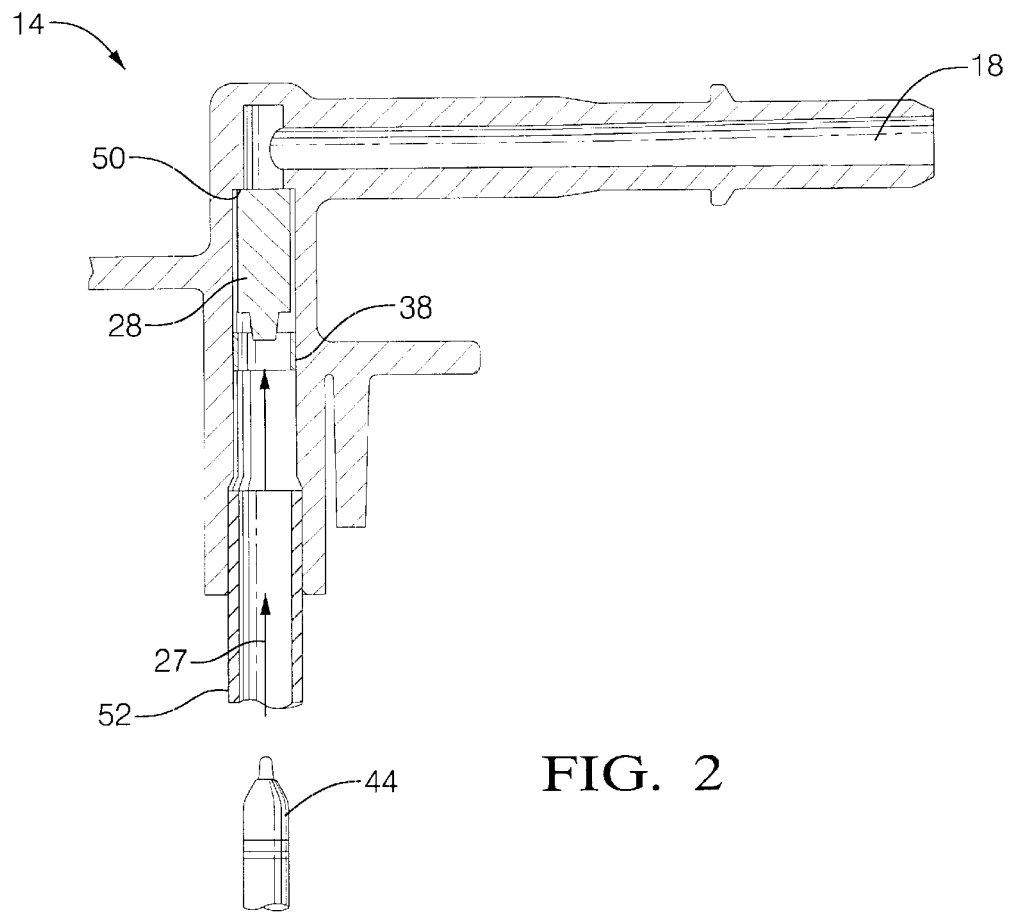
FIG. 2 is a partial sectional view of the cover of the modular reservoir assembly, showing a check valve plunger assembly of the invention in a closed state within the return line fluid channel.
Figure 3:
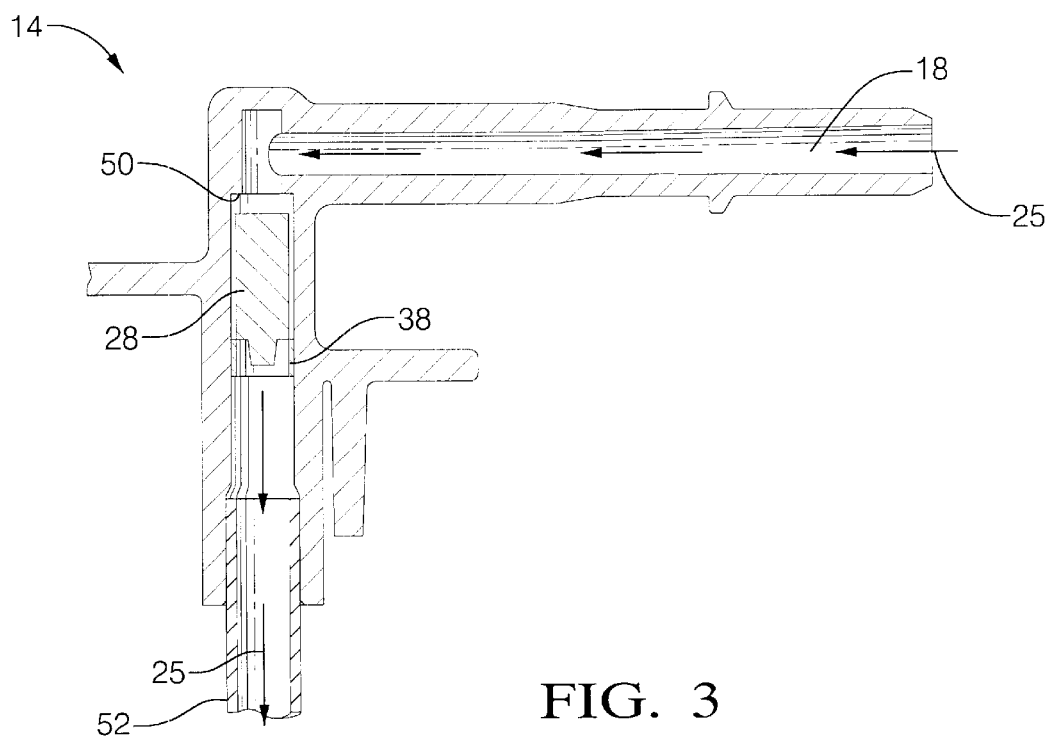
FIG. 3 is a partial sectional view of the cover of the modular reservoir assembly, illustrating the check valve plunger of the invention in an open state within the return line fluid channel.

Referring now to FIGS. 2–3, a check valve plunger 28 is placed in the return line fluid channel 18 on the underside of the modular reservoir cover 14. As illustrated in FIG. 2, during situations in which the reverse flow of the fuel and/or vapor 27 can occur, such as when the vehicle has overturned, the fuel line has been severed and/or during maintenance of the vehicle, the check valve plunger 28 prevents the undesirable flow of fuel and/or vapor from exiting the reservoir through the return line fluid channel 18 and subsequently out of the vehicle. During these situations, the check valve plunger 28 is urged toward, and seats against, a valve seat 50 formed within the wall of the return line fluid channel 18. This stops the reverse flow of the fuel and vapor. During normal operating conditions, as illustrated in FIG. 3, the check valve plunger 28 moves away from the valve seat 50, as the hot return fuel 25 flows past the check valve plunger 28 and enters the reservoir 12. More specifically, the returning fuel 25 pushes the check valve plunger 28 away from the valve seat 50 and then flows through the flow channels that are defined between the longitudinal ribs 42 formed on the body portion 32 of the plunger 28.

As illustrated in FIG. 4, the check valve plunger assembly 24 includes a check valve plunger 28 and a retention device 36. Although manufactured as an integral part of the plunger assembly 24, the retention device 36 is designed to be broken away from the check valve plunger 28. As shall be apparent from the following description, this breakaway feature of the retention device 36 overcomes the difficulties heretofore encountered during assembly of the prior art check valve plungers into the return line fluid channel 18.

FIGS. 4–6 best illustrate the specific features of the check valve plunger assembly 24. The check valve plunger 28 has a first end 30, a second end 34 and a body portion 32. The longitudinal ribs 42 along the body portion of check valve plunger 28 define the flow channels for the return fuel 25. The body portion 32 extends between the first end 30 and second end 34 of the check valve plunger 28, as best shown in FIG. 6.

Figure 8:
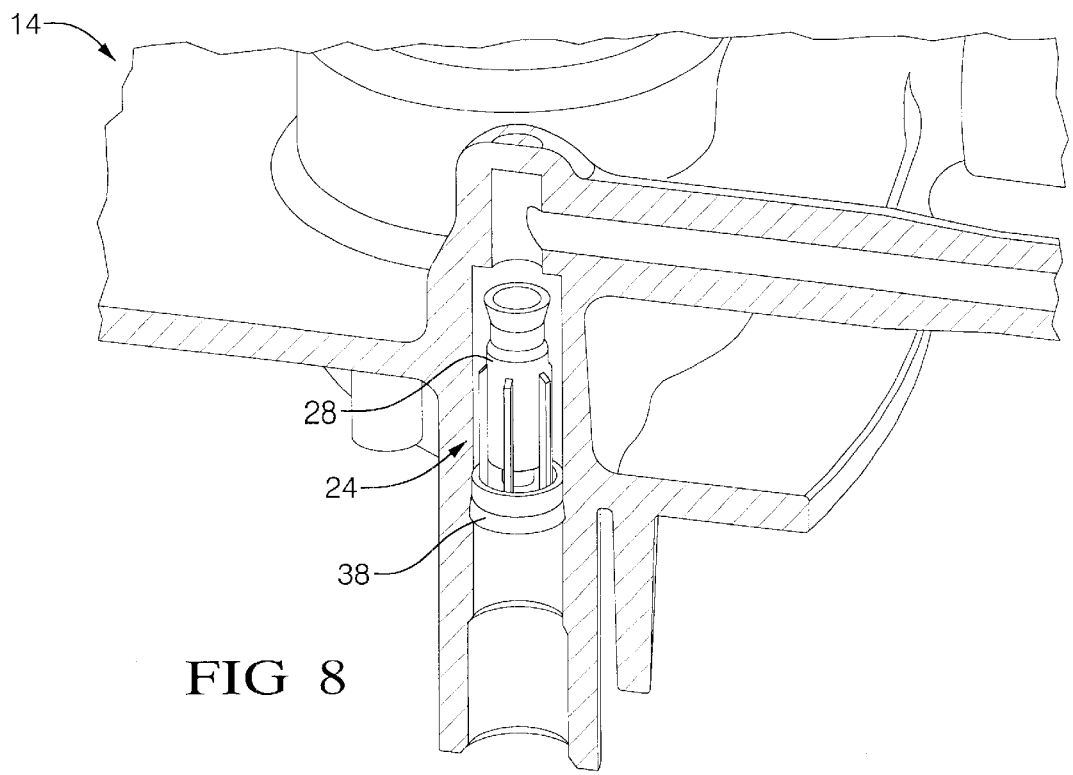
FIG. 8 is a cross-sectional isometric view of a modular reservoir assembly with the check valve plunger assembly of FIG. 4 in an open state within the return line fluid channel.
Figure 9:
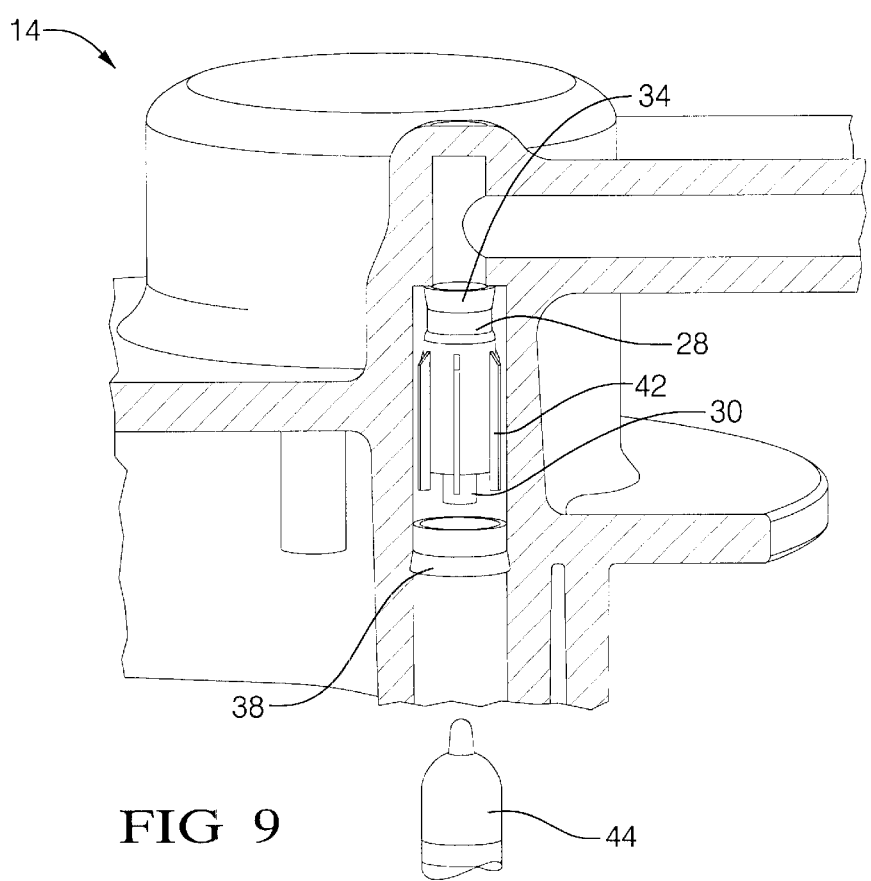
FIG. 9 is a cross-sectional isometric view of a modular reservoir assembly with the check valve plunger assembly of FIG. 4 in a closed state within the return line fluid channel.

FIGS. 4–6, as well as FIGS. 7–9, show an optional elastomer sealing member forming the second end 34 of the check plunger 28. This sealing member 34 prevents any undesirable leakage of fuel and/or vapor when the check valve plunger 28 is in the closed state within the return line fluid channel 18. This elastomeric sealing member 34 is described in more detail below.

The retention device 36 has a ring shaped portion 38. The retention device 36 is capable of being positioned around the check valve plunger 28 such that the ring shaped portion 38 surrounds at least a portion of the first end 30 of the check valve plunger 28. As illustrated in FIG. 5, breakaway connection means 40 are provided. The breakaway connection means 40 connect the first end 30 of check valve plunger 28 with the ring shaped portion 38 of the retention device 36.

The ring shaped portion 38 has an inner diameter of a predetermined dimension, making it capable of receiving a separating means 44 therethrough for breaking the breakaway connection means 40. An example of a separating means 44 is illustrated in FIGS. 2 and 9. Besides the one depicted in FIGS. 2 and 9, any well known type of separating means may be used for breaking the breakaway connection means 40. This separating means 44 typically comprises a detail which enters through the inner diameter of the ring shaped portion 38 and impacts against the check valve plunger 28 until separation of the check valve plunger 28 from the retention device 36 occurs while pressing the ring shaped retention device to a set depth. Guide rods 52 may optionally be inserted within the channel 18 to retain the check valve plunger 28 within the channel 18. The retention device 36 of the invention, however, is capable of retaining the plunger 28 within the fluid channel 18, as further described below and as best shown in FIGS. 7–9. The step of inserting the guide rods 52 within the channel 18 occurs subsequent to the step of breaking the breakaway connection means 40.

The inner diameter of the ring shaped portion 38 is less than an outer diameter of at least a portion of the body portion 32 of the check valve plunger 28. This difference in diameter prevents the body portion 32, as well as the second end 34 of the check valve plunger 28, from passing through the ring shaped portion 38 and out of the return line fluid channel 18. Thus, the ring shaped portion 38 of retention device 36 retains the check valve plunger 28 within the return line fluid channel 18.

The inner diameter of the ring shaped portion 38 is, however, greater than an outer diameter of the first end 30 of the check valve plunger 28. Thus, the dimensions of these respective diameters are such so as to allow the first end 30 of the check valve plunger 28 to pass through the ring shaped portion 38 of the retention device 36.

Also unique to the invention is the optional use of an elastomeric material employed as a valve element. Specifically, the second end 34 of check valve plunger 28 is formed from an elastomeric material such as a fluorocarbon elastomer. Any well known elastomeric material, however, may be used, as long as it is capable of sealing with the surface of valve seat 50 and capable of withstanding the relatively high temperatures typically prevalent within the return line fluid channel 18. The second end 34 of check valve plunger 28 should include no surface imperfections (i.e. scratches, shrink marks, dents or other defects) that could adversely affect valve sealing.

The body portion 32 and the first end 30 of check valve plunger 28 should be formed from a hard and brittle plastic material, preferably a 100% virgin plastic material. The second end 34 of check valve plunger 28 is chemically bonded to the body portion 32 of the check valve plunger 28.

The invention also provides a method of inserting the check valve plunger 28 within the return line fluid channel 18. The method comprises the steps of providing a check valve plunger assembly 24 having an integral breakaway retention device 36 including at least one breakaway connection means 40; inserting the check valve plunger assembly 24 within the fluid channel 18 until the check valve plunger 28 contacts valve seat 50 within the channel 18; providing a separating means 44 for breaking the at least one breakaway connection means 40; and inserting the separating means 44 between the check valve plunger 28 and the retention device 36 to break the at least one breakaway connection means 40 and to separate the check valve plunger 28 from the retention device 36 thereby enabling the check valve plunger 28 to move within the fluid channel 18. Guide rods 52 may be subsequently inserted into the fluid channel 18.

FIG. 8 shows the check valve plunger 28 in the open state. In particular, the second end 34 of plunger 28 is unseated from valve seat 50, with the plunger 28 in its entirety being retained within the channel by the ring shaped portion 38. FIG. 9 shows the check valve plunger 28 in the closed state. Specifically, the second end 34 of plunger 28 is shown seated against valve seat 50, with the check valve plunger 28 in its entirety drawn away from the ring shaped portion 38.

The presently preferred embodiment for carrying out the invention has been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

What is claimed is:

1. A check valve plunger assembly having an integral breakaway retention device, said check valve plunger assembly comprising:
   (a) a check valve plunger having a first end, a second end, and a body portion extending between said first and second end;
   (b) a retention device having a ring shaped portion, said retention device capable of being positioned around said check valve plunger such that said ring shaped portion surrounds at least a portion of said first end of said check valve plunger; and
   (c) breakaway connection means connecting said first end of said check valve plunger with said ring shaped portion of said retention device.

2. A check valve plunger assembly as recited in claim 1 wherein said ring shaped portion has an inner diameter having a predetermined dimension capable of receiving a separating means therethrough for breaking said breakaway connection means.

3. A check valve plunger assembly as recited in claim 2 wherein said inner diameter of said ring shaped portion is less than an outer diameter of at least a portion of said body portion of said check valve plunger so as to prevent said body portion of said check valve plunger from passing through said ring shaped portion.

4. A check valve plunger assembly as recited in claim 3 wherein said ring shaped portion has an inner diameter which is greater than an outer diameter of said first end of said check valve plunger so as to allow said first end of said check valve plunger to pass through said ring shaped portion.

5. A check valve plunger assembly as recited in claim 1 wherein said second end of said check valve plunger is formed from an elastomeric material.

6. A check valve plunger assembly as recited in claim 5 wherein said elastomeric material comprises a fluorocarbon elastomer.

7. A check valve plunger assembly as recited in claim 5 wherein said body portion and said first end of said check valve plunger is formed from a virgin plastic material.

8. A check valve plunger assembly as recited in claim 7 wherein said second end of said check valve plunger is chemically bonded to said body portion of said check valve plunger.

9. A method of inserting a check valve plunger within a fluid channel, said method comprising the steps of:
   (a) providing a check valve plunger assembly having an integral breakaway retention device, said integral breakaway retention device being connected with a portion of said check valve plunger by at least one breakaway connection means;
   (b) inserting said check valve plunger assembly within said fluid channel;
   (c) providing a separating means for breaking said at least one breakaway connection means; and
   (d) inserting said separating means between said check valve plunger and said retention device to break said at least one breakaway connection means and to separate said check valve plunger from said retention device enabling said check valve plunger to move within said fluid channel.

10. A method of inserting a check valve plunger within a fluid channel, as recited in claim 9 wherein said retention device comprises a ring shaped portion circumscribing a first end of said check valve plunger.

11. A method of inserting a check valve plunger within a fluid channel, as recited in claim 9 wherein said step of inserting said check valve plunger assembly within said fluid channel comprises pressing said check valve plunger into said fluid channel until said check valve plunger contacts a valve seat within said fluid channel.

12. A method of inserting a check valve plunger within a fluid channel, as recited in claim 10 wherein said step of inserting said separating means comprises inserting a detail through an inner diameter of said ring shaped portion and impacting said detail against said check valve plunger until said check valve plunger separates from said retention device.

13. A method of inserting a check valve plunger within a fluid channel, as recited in claim 9 including the step of inserting guide rods within said channel to retain said check valve plunger within said fluid channel.

14. A method of inserting a check valve plunger within a fluid channel, as recited in claim 13 wherein the step of inserting guide rods within said fluid channel occurs subsequent to said step of breaking said at least one breakaway connection means.

15. A method of inserting a check valve plunger within a fluid channel, as recited in claim 12, wherein a second end of said check valve plunger is formed from an elastomeric material.

16. A method of inserting a check valve plunger within a fluid channel, as recited in claim 15, wherein said elastomeric material comprises a fluorocarbon elastomer.

17. A method of inserting a check valve plunger within a fluid channel, as recited in claim 10 wherein upon separation of said check valve plunger from said retention device, said first end of said check valve plunger is capable of extending through said ring shaped portion of said retention device.

18. A method of inserting a check valve plunger within a fluid channel, as recited in claim 16, wherein a body portion of said check valve plunger has an outer diameter which is greater than said inner diameter of said ring shaped portion of said retention device so as to prevent at least a portion of said body portion and said second end of said check valve plunger from passing through said ring shaped portion and exiting said fluid channel.

* * * * *